(12) United States Patent
Hamilton et al.

(10) Patent No.: US 8,331,370 B2
(45) Date of Patent: *Dec. 11, 2012

(54) DISTRIBUTED ROUTING ARCHITECTURE

(75) Inventors: James R. Hamilton, Seattle, WA (US); Alan M. Judge, Dublin (IE); David J. McGaugh, Seattle, WA (US); Justin O. Pietsch, Bothell, WA (US); David J. O'Meara, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 196 days.

This patent is subject to a terminal disclaimer.

(21) Appl. No.: 12/641,255

(22) Filed: Dec. 17, 2009

(65) Prior Publication Data

US 2011/0149963 A1 Jun. 23, 2011

(51) Int. Cl.
*H04L 12/28* (2006.01)
(52) U.S. Cl. ...................... 370/392; 370/408
(58) Field of Classification Search .................. 370/392, 370/400, 408
See application file for complete search history.

(56) References Cited

U.S. PATENT DOCUMENTS

| | | | |
|---|---|---|---|
| 5,649,185 A | 7/1997 | Antognini et al. | |
| 5,664,106 A | 9/1997 | Caccavale | |
| 5,819,033 A | 10/1998 | Caccavale | |
| 6,185,598 B1 | 2/2001 | Farber et al. | |
| 6,192,051 B1 * | 2/2001 | Lipman et al. | 370/389 |
| 6,438,592 B1 | 8/2002 | Killian | |
| 6,553,419 B1 | 4/2003 | Ram | |
| 6,560,610 B1 * | 5/2003 | Eatherton et al. | 1/1 |
| 6,633,324 B2 | 10/2003 | Stephens, Jr. | |
| 6,698,013 B1 | 2/2004 | Bertero et al. | |
| 6,978,418 B1 | 12/2005 | Bain et al. | |
| 7,009,943 B2 | 3/2006 | O'Neil | |
| 7,023,465 B2 | 4/2006 | Stephens, Jr. | |
| 7,065,496 B2 | 6/2006 | Subbloie et al. | |
| 7,085,825 B1 | 8/2006 | Pishevar et al. | |

(Continued)

FOREIGN PATENT DOCUMENTS

WO WO 2012/044587 A1 4/2012

OTHER PUBLICATIONS

S. Nilsson, "IP-Address Lookup Using LC-Tries," Jun. 1999, IEEE Journal on Selected Areas in Communications, vol. 17 Issue 6, p. 1083-1092.*

(Continued)

*Primary Examiner* — Man Phan
*Assistant Examiner* — Ryan Kavleski
(74) *Attorney, Agent, or Firm* — Knobbe Martens Olson & Bear LLP

(57) ABSTRACT

A hierarchical distributed routing architecture including at least two levels, or layers, for receiving, processing and forwarding data packets between network components is provided. The core level router components receive an incoming packet from a network component and identify a distribution level router component based on processing a subset of the destination address associated with the received packet. The distribution level router components receive a forwarded packet and forward the packet to a respective network. The mapping, or other assignment, of portions of destination addresses to router components of the distributed routing environment may be managed by a router management component. In some embodiments, mapping of destination address to router components may be based, at least in part, on traffic volumes associated with the mapped destination addresses.

32 Claims, 8 Drawing Sheets

U.S. PATENT DOCUMENTS

| | | | |
|---|---|---|---|
| 7,107,273 | B2 | 9/2006 | Ohata et al. |
| 7,120,871 | B1 | 10/2006 | Harrington |
| 7,120,874 | B2 | 10/2006 | Shah et al. |
| 7,146,560 | B2 | 12/2006 | Dang et al. |
| 7,269,657 | B1 | 9/2007 | Alexander et al. |
| 7,316,648 | B2 | 1/2008 | Kelly et al. |
| 7,320,131 | B1 | 1/2008 | O'Toole, Jr. |
| 7,343,399 | B2 | 3/2008 | Hayball et al. |
| 7,502,836 | B1 | 3/2009 | Menditto et al. |
| 7,581,224 | B2 | 8/2009 | Romero |
| 7,624,169 | B2 | 11/2009 | Lisiecki et al. |
| 7,650,376 | B1 | 1/2010 | Blumenau |
| 7,685,270 | B1 | 3/2010 | Vermeulen et al. |
| 7,698,418 | B2 | 4/2010 | Shimada et al. |
| 7,739,400 | B2 | 6/2010 | Lindbo et al. |
| 7,748,005 | B2 | 6/2010 | Romero et al. |
| 7,752,301 | B1 | 7/2010 | Maiocco et al. |
| 7,756,032 | B2 | 7/2010 | Feick et al. |
| 7,773,596 | B1 * | 8/2010 | Marques ............... 370/392 |
| 7,787,380 | B1 * | 8/2010 | Aggarwal et al. ........ 370/236 |
| 7,865,594 | B1 | 1/2011 | Baumback et al. |
| 7,904,875 | B2 | 3/2011 | Hegyi |
| 7,925,782 | B2 | 4/2011 | Sivasubramanian et al. |
| 7,930,393 | B1 | 4/2011 | Baumback et al. |
| 7,937,456 | B2 | 5/2011 | McGrath |
| 7,961,736 | B2 | 6/2011 | Ayyagari |
| 8,028,090 | B2 | 9/2011 | Richardson et al. |
| 8,051,166 | B1 | 11/2011 | Baumback et al. |
| 8,117,306 | B1 | 2/2012 | Baumback et al. |
| 2002/0069420 | A1 | 6/2002 | Russell et al. |
| 2002/0083118 | A1 | 6/2002 | Sim |
| 2002/0099850 | A1 | 7/2002 | Farber et al. |
| 2002/0116481 | A1 | 8/2002 | Lee |
| 2002/0124098 | A1 | 9/2002 | Shaw |
| 2002/0138437 | A1 | 9/2002 | Lewin et al. |
| 2002/0138443 | A1 | 9/2002 | Schran et al. |
| 2002/0150094 | A1 * | 10/2002 | Cheng et al. ............ 370/389 |
| 2002/0150276 | A1 | 10/2002 | Chang |
| 2002/0163882 | A1 | 11/2002 | Bornstein et al. |
| 2002/0194382 | A1 | 12/2002 | Kausik et al. |
| 2003/0005111 | A1 | 1/2003 | Allan |
| 2003/0149581 | A1 | 8/2003 | Chaudhri et al. |
| 2003/0174648 | A1 | 9/2003 | Wang et al. |
| 2003/0182413 | A1 | 9/2003 | Allen et al. |
| 2003/0204602 | A1 | 10/2003 | Hudson et al. |
| 2003/0221000 | A1 | 11/2003 | Cherkasova et al. |
| 2003/0229682 | A1 | 12/2003 | Day |
| 2003/0233423 | A1 | 12/2003 | Dilley et al. |
| 2004/0010621 | A1 | 1/2004 | Afergan et al. |
| 2004/0049579 | A1 | 3/2004 | Ims et al. |
| 2004/0064293 | A1 | 4/2004 | Hamilton et al. |
| 2004/0064558 | A1 | 4/2004 | Miyake |
| 2004/0073596 | A1 | 4/2004 | Kloninger et al. |
| 2004/0083307 | A1 | 4/2004 | Uysal |
| 2004/0167981 | A1 | 8/2004 | Douglas et al. |
| 2004/0194085 | A1 | 9/2004 | Beaubien et al. |
| 2004/0205162 | A1 | 10/2004 | Parikh |
| 2005/0021706 | A1 | 1/2005 | Maggi et al. |
| 2005/0038967 | A1 | 2/2005 | Umbehocker et al. |
| 2005/0086645 | A1 | 4/2005 | Diao et al. |
| 2005/0108529 | A1 | 5/2005 | Juneau |
| 2005/0114296 | A1 | 5/2005 | Farber et al. |
| 2005/0157712 | A1 * | 7/2005 | Rangarajan et al. ......... 370/388 |
| 2005/0171959 | A1 * | 8/2005 | Deforche et al. .......... 707/100 |
| 2005/0216569 | A1 | 9/2005 | Coppola et al. |
| 2005/0259672 | A1 | 11/2005 | Eduri |
| 2005/0273507 | A1 | 12/2005 | Yan et al. |
| 2006/0020684 | A1 | 1/2006 | Mukherjee et al. |
| 2006/0036720 | A1 | 2/2006 | Faulk, Jr. |
| 2006/0047787 | A1 | 3/2006 | Agarwal et al. |
| 2006/0063534 | A1 | 3/2006 | Kokkonen et al. |
| 2006/0069808 | A1 | 3/2006 | Mitchell et al. |
| 2006/0075084 | A1 | 4/2006 | Lyon |
| 2006/0112176 | A1 | 5/2006 | Liu et al. |
| 2006/0120385 | A1 | 6/2006 | Atchison et al. |
| 2006/0195866 | A1 | 8/2006 | Thukral |
| 2006/0209701 | A1 | 9/2006 | Zhang et al. |
| 2006/0218304 | A1 | 9/2006 | Mukherjee et al. |
| 2006/0251339 | A1 | 11/2006 | Gokturk et al. |
| 2006/0259984 | A1 | 11/2006 | Juneau |
| 2006/0282758 | A1 | 12/2006 | Simons et al. |
| 2007/0011267 | A1 | 1/2007 | Overton et al. |
| 2007/0016736 | A1 | 1/2007 | Takeda et al. |
| 2007/0038994 | A1 | 2/2007 | Davis et al. |
| 2007/0055764 | A1 | 3/2007 | Dilley et al. |
| 2007/0076872 | A1 | 4/2007 | Juneau |
| 2007/0086429 | A1 | 4/2007 | Lawrence et al. |
| 2007/0168517 | A1 | 7/2007 | Weller |
| 2007/0174442 | A1 | 7/2007 | Sherman et al. |
| 2007/0219795 | A1 | 9/2007 | Park et al. |
| 2007/0220010 | A1 | 9/2007 | Ertugrul |
| 2007/0245010 | A1 | 10/2007 | Arn et al. |
| 2007/0250560 | A1 | 10/2007 | Wein et al. |
| 2007/0271385 | A1 | 11/2007 | Davis et al. |
| 2007/0280229 | A1 | 12/2007 | Kenney |
| 2007/0288588 | A1 | 12/2007 | Wein et al. |
| 2008/0025304 | A1 | 1/2008 | Venkataswami et al. |
| 2008/0065724 | A1 | 3/2008 | Seed et al. |
| 2008/0065745 | A1 | 3/2008 | Leighton et al. |
| 2008/0071859 | A1 | 3/2008 | Seed et al. |
| 2008/0082551 | A1 | 4/2008 | Farber et al. |
| 2008/0086559 | A1 | 4/2008 | Davis et al. |
| 2008/0104268 | A1 | 5/2008 | Farber et al. |
| 2008/0172488 | A1 | 7/2008 | Jawahar et al. |
| 2008/0183721 | A1 | 7/2008 | Bhogal et al. |
| 2008/0215718 | A1 | 9/2008 | Stolorz et al. |
| 2008/0215735 | A1 | 9/2008 | Farber et al. |
| 2008/0215750 | A1 | 9/2008 | Farber et al. |
| 2008/0215755 | A1 | 9/2008 | Farber et al. |
| 2008/0222281 | A1 | 9/2008 | Dilley et al. |
| 2008/0222291 | A1 | 9/2008 | Weller et al. |
| 2009/0029644 | A1 | 1/2009 | Sue et al. |
| 2009/0031367 | A1 | 1/2009 | Sue |
| 2009/0031368 | A1 | 1/2009 | Ling |
| 2009/0031376 | A1 | 1/2009 | Riley et al. |
| 2009/0122714 | A1 | 5/2009 | Kato |
| 2009/0187575 | A1 | 7/2009 | DaCosta |
| 2009/0248893 | A1 | 10/2009 | Richardson et al. |
| 2010/0150155 | A1 | 6/2010 | Napierala |
| 2011/0252142 | A1 | 10/2011 | Richardson et al. |
| 2011/0252143 | A1 | 10/2011 | Baumback et al. |

OTHER PUBLICATIONS

Al-Fares, M. et al., "A Scalable, Commodity Data Center Network Architecture", SIGCOMM '08 Proceedings, Seattle, WA, Aug. 17, 2008, pp. 63-74, 66-68, 70-71.

Greenberg, A. et al., "VL2: A scalable and flexible data center network", SIGCOMM '09 Proceedings of the ACM SIGCOMM 2009 Conference on Data Communication, vol. 39, No. 4, Aug. 17, 2009, pp. 51-62.

Greenberg, A. et al., "Networking the Cloud", 29th IEEE International Conference on Distributed Computing Systems (ICDCS 2009) [online] Jun. 22-26, 2009, pp. 1-45, retrieved from the Internet on Mar. 10, 2011: http://www.cse.ohio-state.edu/icdcs2009/Keynote_files/greenberg-keynote.pdf.

Greenberg, A. et al. "Towards a Next Generation Data Center Architecture: Scalability and Commoditization", SIGCOMM '08: Proceedings of the 2008 SIGCOM Conference and Co-Located Workshops NSDR '08, WOSN '08, MOBIARCH '08, NETECON '08, & Presto '08, Seattle, WA, Aug. 17-28, ACM, New York, NY, Aug. 17, 2008, pp. 57-62.

Mysore, R.N. et al., "Portland: a scalable fault-tolerant layer 2 data center network fabric", SIGCOMM '09, Proceedings of the ACM SIGCOMM 2009 Conference on Data Communication, Aug. 17, 2009, pp. 39-50.

International Preliminary Report on Patentability and Written Opinion in PCT/US2010/060567 mailed on Jun. 19, 2012.

International Preliminary Report on Patentability and Written Opinion in PCT/US2010/060569 mailed Jun. 19, 2012.

International Preliminary Report on Patentability and Written Opinion in PCT/US2010/060573 mailed Jun. 19, 2012.

\* cited by examiner

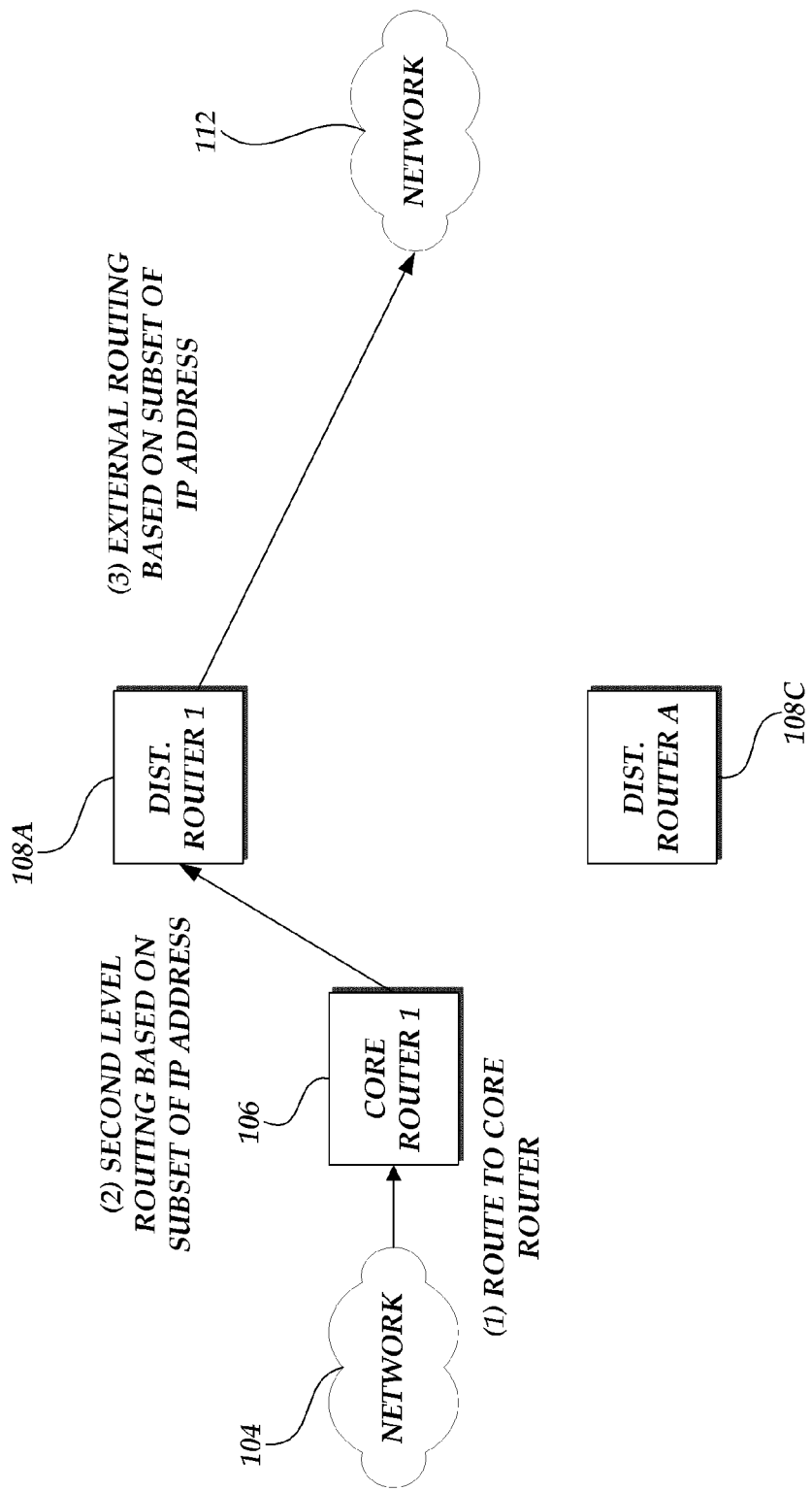

DISTRIBUTED ROUTING ARCHITECTURE

BACKGROUND

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted between multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

To execute the control plane functionality, routers can maintain a forwarding information base ("FIB") that identifies, among other packet attribute information, destination information for at least a subset of possible network addresses, such as Internet Protocol ("IP") addresses. In a typical embodiment, the FIB corresponds to a table of values specifying network forwarding information for the router. In one aspect, commercial level routing hardware components can include customized chipsets, memory components and software that allows a single router to support millions of entries in the FIB. However, such commercial level routing hardware components are typically very expensive and often require extensive customization. In another aspect, commodity-based routing hardware components are made of more generic components and can be less expensive than commercial level routing hardware components by a significant order of magnitude. However, such commodity-based routing hardware components typically only support FIBs on the order of thousands of entries.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A-2D are block diagrams illustrative of the distributed routing environment of FIG. 1A illustrating the routing of a received packet within the hierarchical distributed routing component architecture;

DETAILED DESCRIPTION

Figure 1A:
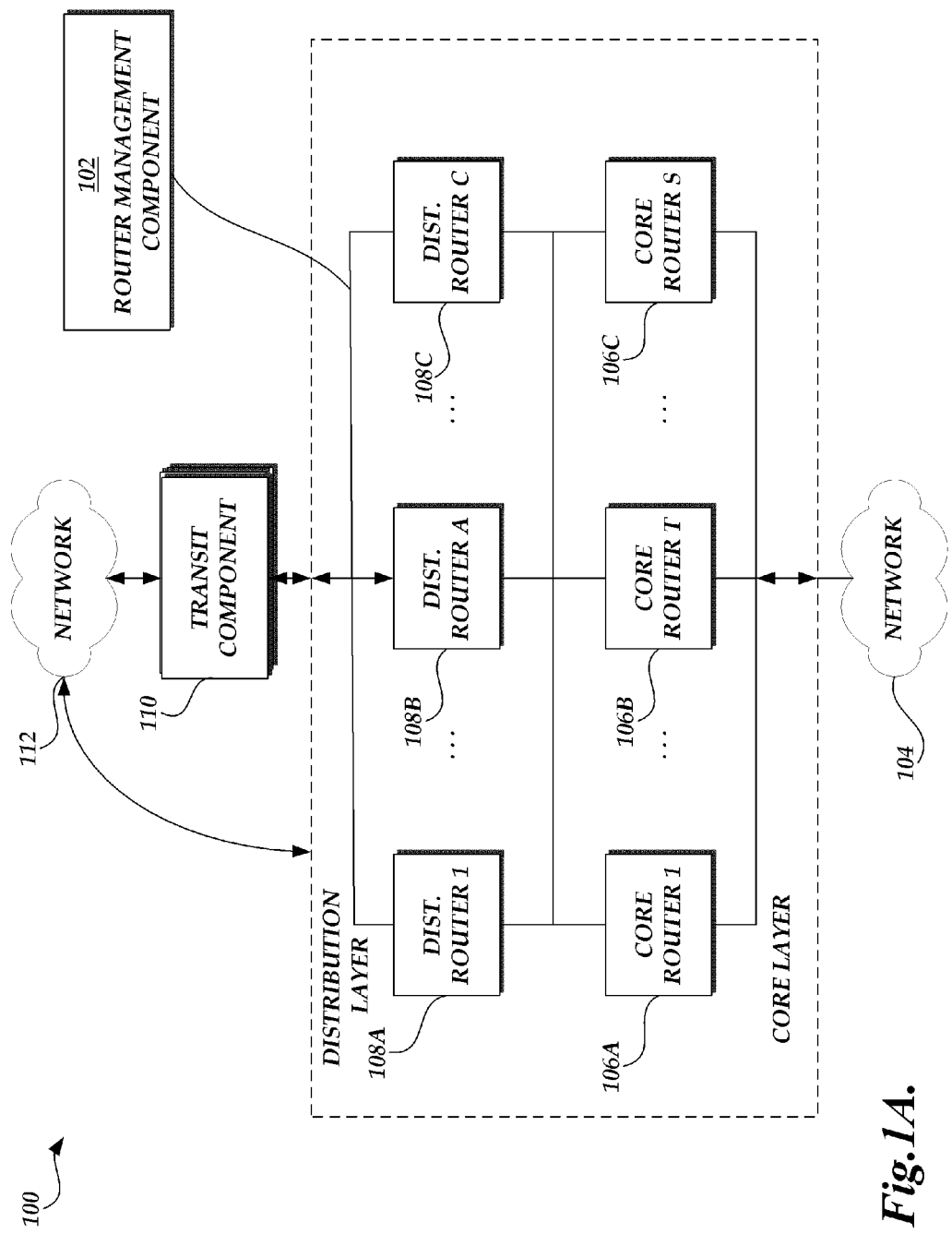
FIG. 1A is a block diagram illustrative of one embodiment of a distributed routing environment including a router management component and a hierarchical, distributed routing component architecture.

Generally described, the present disclosure corresponds to a distributed routing architecture. Specifically, the present disclosure corresponds to a hierarchical distributed routing architecture including at least two logical levels, or layers, for receiving, processing and forwarding data packets between network components. In one embodiment, the two logical levels can corresponds to a core level and a distribution level. Illustratively, the core level corresponds to one or more router components that receive an incoming packet from a network component and processes the destination address information associated with the received packet. The core level router component then identifies a distribution level router component based on a subset of the destination address associated with the received packet. The distribution level corresponds to one or more router components that receive a forwarded packet from a core level router component and further processes the destination address information associated with the received packet. The distribution level router component identifies an appropriate transit route from the hierarchical distributed routing architecture. Each distribution level router component is associated with, or otherwise corresponds to, a subset of the FIB associated with the distributed routing architecture. The mapping, or other assignment, of portions of the FIB associated with the distributed routing environment is managed by a router management component.

In one embodiment, each of the router components associated with the core level and distribution level can correspond more closely to commodity based router components/ hardware. In another embodiment, the core level and distribution level router components correspond to logical router components that do not necessarily have a corresponding hardware router component. For example, one or more logical router components within each level may be implemented in the same hardware router component. Likewise, the logical router components associated with different levels of the distributed routing architecture may be implemented in the same hardware router component. In a further example, the core level and distribution level router components may correspond to a router component that operates as both a core level router component for receiving incoming packets and determining an appropriate distribution level router component and as a distribution level router component.

In the above described embodiments, however, because responsibility for maintaining the FIB associated with the distributed routing environment is divided among several router components, the processing and memory restraints associated with commodity based router components/hardware can be mitigated. Various implementations, combination and applications for dividing the FIB associated with the distributed routing environment will be described in accordance with the distributed routing environment. However, one skilled in the relevant art will appreciate that such embodiment and examples are illustrative in nature and should not be construed as limiting.

Turning now to FIG. 1A, a distributed routing environment 100 for implemented a hierarchical distributed routing architecture will be described. The distributed routing environment 100 includes a router management component 102 for controlling the routing information utilized by the distributed routing environment 100. Specifically, the router managed component 102 can receive all upstream routing information to be used by the distributed routing environment 100 and allocate the assignment of the upstream routing information among the components of the distributed routing environment 100, as will be described. In one embodiment, the router management component 102 can correspond to a computing device in communication with one or more components of the distributed routing environment 100. Illustrative computing devices can include server computing devices, personal computing devices or other computing devices that include a processor, memory and other components for executing instructions associated with the function of the router management component 102. In another embodiment, the router management component 102 may be implemented as a software component that is executed on one or more of the router components described below. Illustratively, the router management component 102 maintains and updates the FIB associated with the distributed routing environment 100. Additionally, the router management component 102 can allocate responsibility for portions of the FIB entries to the various layers of the distributed routing environment 100, as will be described below. In one embodiment, the router management component 102 can partition the FIB according to the distribution to the various router components of the distributed routing environment 100 and distribute respective portions of the FIB to be maintained in a memory associated with the various router components.

With continued reference to FIG. 1A, the distributed routing environment 100 includes a first communication network 104 that transmits data packets to the distributed routing environment 100. The first communication network 104 may encompass any suitable combination of networking hardware and protocols necessary to establish packet-based communications to the distributed routing environment 100. For example, the communication network 104 may include private networks such as local area networks (LANs) or wide area networks (WANs) as well as public or private wireless networks. In such an embodiment, the communication network 104 may include the hardware (e.g., modems, routers, switches, load balancers, proxy servers, etc.) and software (e.g., protocol stacks, accounting software, firewall/security software, etc.) necessary to establish a networking link with the distributed routing environment 100. Additionally, the communication network 104 may implement one of various communication protocols for transmitting data between computing devices. As will be explained in greater detail below, the communication protocols can include protocols that define packet flow information, such as network address information corresponding to the Internet Protocol version 4 (IPv4) and the Internet Protocol version 6 (IPv6) Internet Layer communication network protocols. One skilled in the relevant art will appreciate, however, that present disclosure may be applicable with additional or alternative protocols and that the illustrated examples should not be construed as limiting.

In communication with the first communication network 104 is a first level of the distributed routing environment 100, generally referred to as the core layer or core level. In one embodiment, the core level corresponds to one or more logical router components, generally referred to as core level routers 106A, 106B and 106C. As previously described, within the distributed routing environment 100, the core level routers 106A, 106B, 106C receive an incoming packet from a component from the network 104 and process the destination address by identifying a distribution level router component based on a subset of the destination address associated with the received packet. Illustratively, the subset of the destination address can correspond to less than the entire destination IP address, such as the highest most values of the IP address. As previously described, the core level routers 106A, 106B, 106C can correspond to logical router components implemented on one or more hardware components. In one embodiment, each logical router component can correspond with a dedicated physical router component. In another embodiment, each logical router component can correspond to a physical router component shared by at least one other logical router component in the distributed router environment 100. In an alternative embodiment, at least some portion of the core layer may be implemented by components outside the distributed routing environment 100. In such an embodiment, such external components would directly address a distribution level router component (described below) of the distributed routing environment 100.

The distributed routing environment 100 can further include a second level of logical router components, generally referred to as the distribution layer or distribution level. In one embodiment, the distribution level corresponds to one or more router components, generally referred to as distribution level routers 108A, 108B and 108C. As previously described, within the distributed routing environment 100 the distribution level routers 108A, 108B and 108C receiving an incoming packet from a core routing component 102 and process the incoming packet according one or attributes of the received packet. Illustratively, the subset of the destination address can correspond to a larger subset of the destination IP address used by the core level routers 106A, 106B, 106C. In this embodiment, the routing performed by the distribution level can correspond to a more refined routing of the received packet relative to the core level routing. As described above with the core level routers 106A, 106B, 106C, the distribution level routers 108A, 108B and 108C can correspond to logical router components implemented on one or more hardware components. In one embodiment, each logical router component can correspond with a dedicated physical router component. In another embodiment, each logical router component can correspond to a physical router component shared by at least one other logical router component in the distributed router environment 100.

In communication with the distribution level router components 108A, 108B and 108C in an external transit component 110. In one embodiment, the external transit component 110 corresponds to one or more router components that receive forwarded packets from a distribution level router component 108A, 108B, 108C. The external transit component 110 can then facilitate the forwarding of packets further "upstream" to another communication network 112 node. Illustratively, the external transit component 110 may be optionally implemented in the distributed routing environment 100. Accordingly, the distribution level router components 108A, 108B and 108C may communicate directly with external network nodes without utilization of the external transit component 110.

Similar to communication network 102, communication network 112 may encompass any suitable combination of networking hardware and protocols necessary to establish packet-based communications to the distributed routing environment 100. For example, the communication network 112 may include private networks such as local area networks (LANs) or wide area networks (WANs) as well as public or private wireless networks. In such an embodiment, the communication network 112 may include the hardware (e.g., modems, routers, switches, load balancers, proxy servers, etc.) and software (e.g., protocol stacks, accounting software, firewall/security software, etc.) necessary to establish a networking link with the distributed routing environment 100. As described above with regard to the communication network 104, the communication network 112 may implement one of various communication protocols for transmitting data between computing devices. One skilled in the relevant art will appreciate, however, that present disclosure may be applicable with additional or alternative protocols and that the illustrated examples should not be construed as limiting.

Figure 1B:
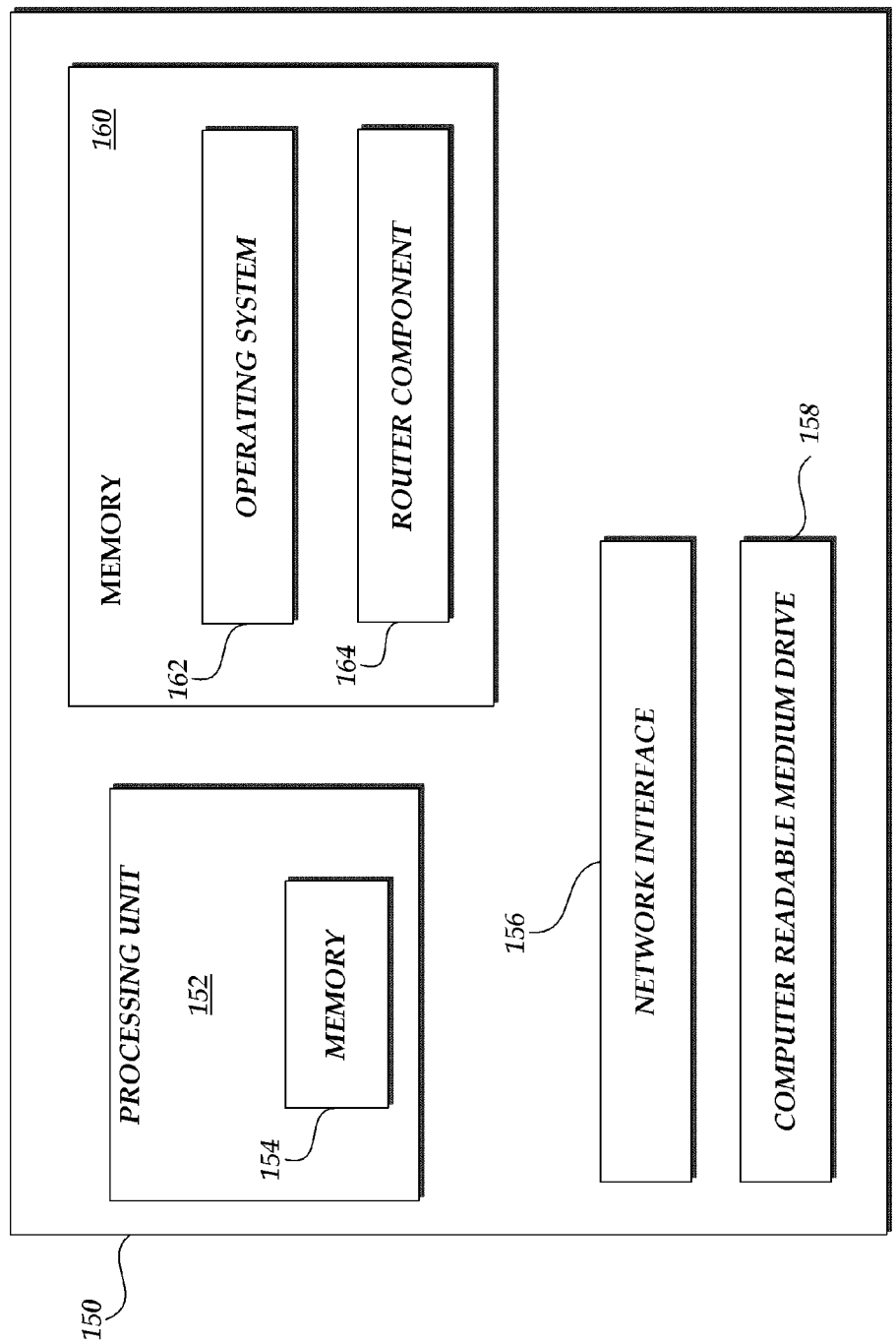
FIG. 1B is a block diagram illustrative of components of a router component utilized in accordance with the distributed routing environment of FIG. 1A.

In an illustrative embodiment, the logical router components (106 and 108) in FIG. 1A may correspond to a computing device having processing resources, memory resources, networking interfaces, and other hardware/software for carrying the described functionality for each of the logical router components. With reference now to FIG. 1B, a block diagram illustrative of components of a router component 150 utilized in accordance with the distributed routing environment 100 of FIG. 1A will be described. The general architecture of the router component 150 depicted in FIG. 1B includes an arrangement of computer hardware and software components that may be used to implement one or more logical router components 106 and 108. Those skilled in the art will appreciate that the router component 150 may include many more (or fewer) components than those shown in FIG. 1B. It is not necessary, however, that all of these generally conventional components be shown in order to provide an enabling disclosure.

As illustrated in FIG. 1B, the router component 150 includes a processing unit 152, at least one network interface 156, and at least one computer readable medium drive 158, all of which may communicate with one another by way of a communication bus. The processing unit 152 may thus receive information and instructions from other computing systems or services via a network. The processing unit 152 may also be associated with a first memory component 154 for recalling information utilized in the processing of destination address information, such as at least a portion of a FIB associated with the distributed routing environment 100. The memory 154 generally includes RAM, ROM and/or other persistent memory. The processing unit 152 may also communicate to and from memory 160. The network interface 156 may provide connectivity to one or more networks or computing systems. The at least one computer readable medium drive 158 can also correspond to RAM, ROM, optical memory, and/or other persistent memory that may persists at least a portion of the FIB associated with the distributed routing environment 100. In an illustrative embodiment, the access time associated with the memory component 154 may be faster than the access time associated with the computer readable medium driver 158. Still further, the computer readable medium drive 158 may be implemented in a networked environment in which multiple router components 150 share access to the information persisted on the computer readable medium drive 158.

The memory 160 contains computer program instructions that the processing unit 152 executes in order to operate the dynamic classifier. The memory 160 generally includes RAM, ROM and/or other persistent memory. The memory 160 may store an operating system 162 that provides computer program instructions for use by the processing unit 152 in the general administration and operation of the router component 150. The memory 160 may further include computer program instructions and other information for implementing one or more of the logical router components in the distributed routing environment 100. For example, in one embodiment, the memory 160 includes a router module 164 that implements the functionality associated with any of the routers 106 and 108. In the event that multiple logical routers are implemented by the same router component 150, memory 160 may have each instance of a router module 164.

In an illustrative embodiment, each router component 150 may be embodied as an individual hardware component for implementing one or more logical routers 106 and 108. Alternatively, multiple router components 150 may be grouped and implemented together. For example, each router component 150 may correspond to an application-specific integrated circuit (ASIC) having a processing unit 152, memory 154 and memory 160 (or other components with similar functionality). The router components 150 may share one or more components, such as the network interface 156 and computer readable medium 158, via a common communication bus.

Figure 2A:
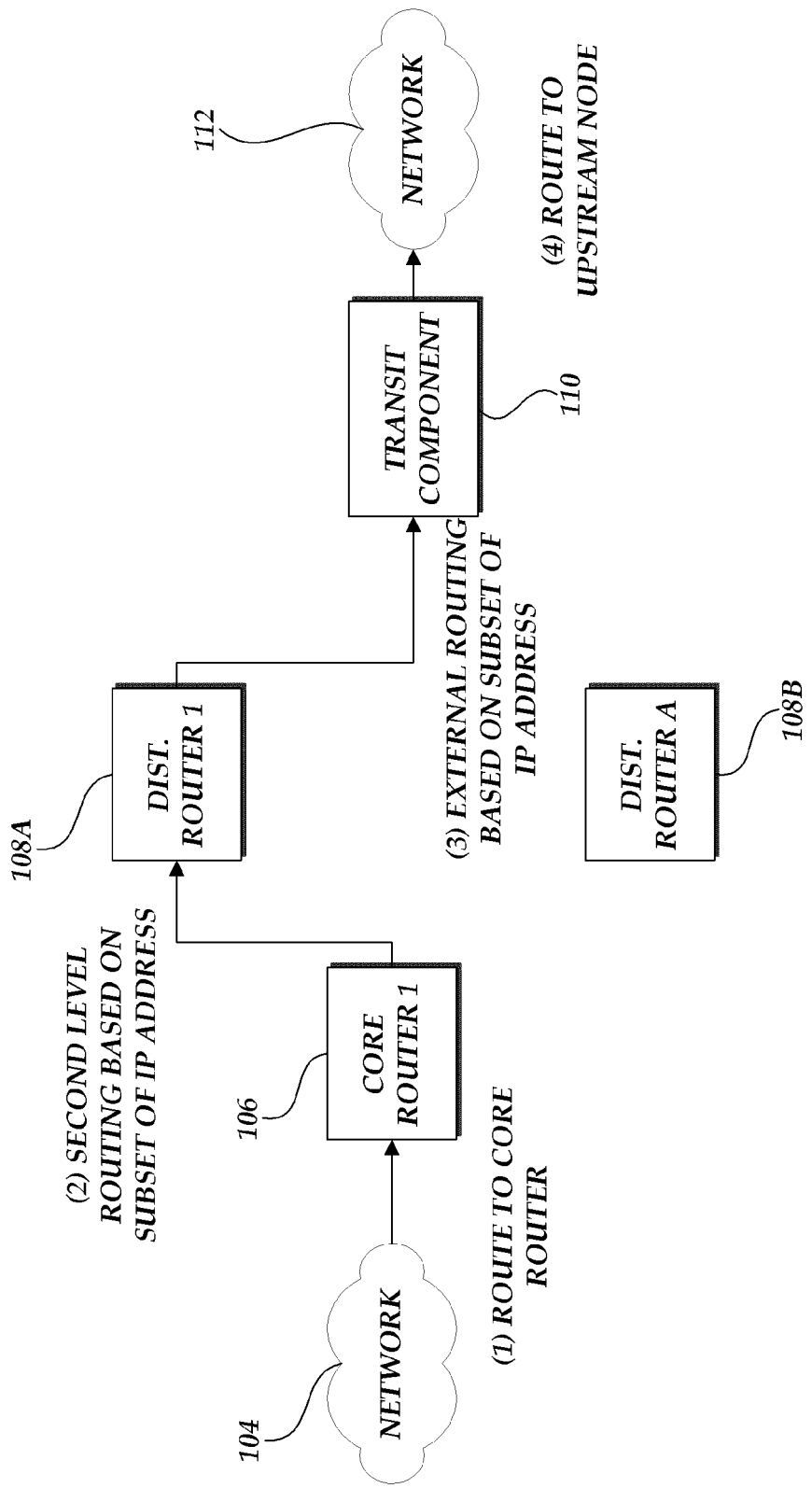

With reference now to FIGS. 2A-2D, the processing of receiving packets by the distributed routing environment 100 will be described. With reference first to FIGS. 2A and 2B, an incoming packet is received from the communication network 104 to a core level router 106. The core level router 106 that receives the incoming packet may be selected according to a variety of techniques including, but not limited to, load balancing, random selection, round robin, hashing and other packet distribution techniques. Upon receipt, the core level router 106 processes destination IP address and utilizes a subset of the destination IP address to identify a second level destination router component that will perform a second level of routing. In an illustrative embodiment, the core level router 106 utilizes the most significant bits of the IP address, such as the eight most significant bits of the destination address. The selection of the subset of IP addresses corresponding to a selection of the most significant bits is generally referred to as prefix. For example, selection of the eight most significant bits corresponds to a prefix length of "8". Selection of the sixteen most significant bits corresponds to a prefix length of "16". One skilled in the relevant art will appreciate that the number of bits utilized by the core level router 106 may vary. Additionally, in an alternative embodiment, the core level router 106 may use different methodologies to allocate, or otherwise subdivide, the address space serviced by the distributed routing environment 100, including, for example, a subdivision based on IP flow-level information or IP flow descriptor. Such IP flow-level information can include source and destination IP address information or port information.

Based on the processing of the first subset of the destination address, the core level router 106 forwards the packet to a distribution level router, in this case illustratively 108A, "DIST ROUTER 1." As previously described, the receiving distribution level router 108A processes the destination address of the received packet and also utilizes a subset of the destination IP address to forward the received packet to the next network destination (outside of the distributed routing environment 100). Similar to the core level router 106, the receiving distribution level router can be configured to utilize a selection of the most significant bits of the IP address (e.g., the prefix) to route the packet. In an illustrative embodiment, the prefix used by the distribution level router 108A is greater than the prefix used by the core level router 106. As illustrated in FIG. 2A, an external transit component 110 may be utilized to facilitate the transfer. Alternatively, and with reference to FIG. 2B the distribution level router 108A may transmit the packet directly to the communication network 112.

Figure 2C:
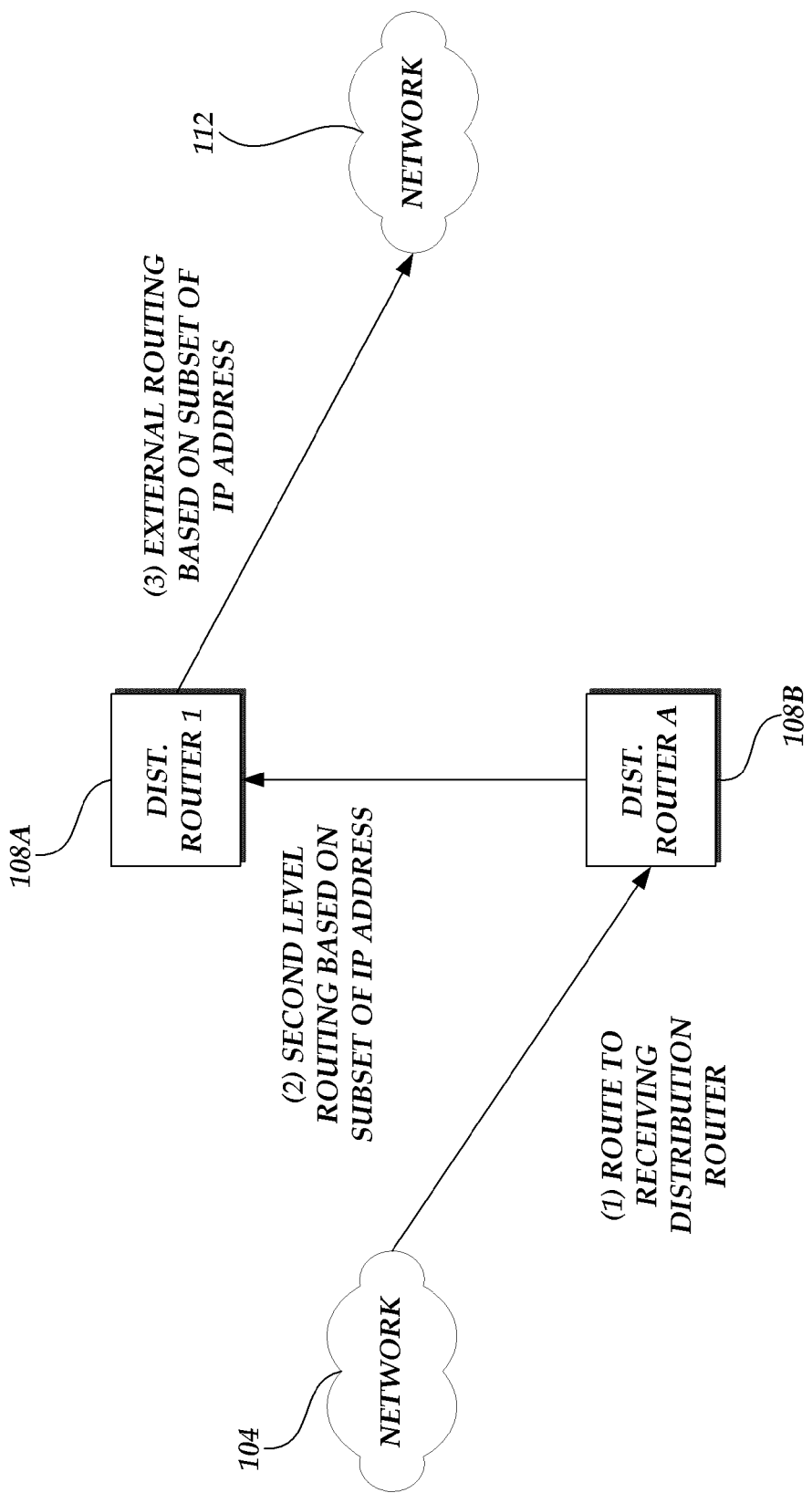

With reference to FIG. 2C, in an alternative embodiment, the functionality associated with the core level router components 106 may be implemented by distribution level router components 108. As illustrated in FIG. 2C, an incoming packet is received from the communication network 104 to a distribution level router 108B. The distribution level router 108B that receives the incoming packet may be selected according to a variety of techniques including, but not limited to, load balancing, random selection, round robin, hashing and other packet distribution techniques. Upon receipt, the distribution level router 108B processes destination IP address and utilizes a subset of the destination IP address to identify a second level distribution router component that will perform a second level of routing. In an illustrative embodiment, the distribution level router 108B utilizes the most significant bits of the IP address, such as the eight most significant bits of the destination address. The selection of the subset of IP addresses corresponding to a selection of the most significant bits is generally referred to as prefix. One skilled in the relevant art will appreciate that the number of bits utilized by the distribution level router 108B may vary. Additionally, in an alternative embodiment, the distribution level router 108B may use different methodologies to allocate, or otherwise subdivide, the address space serviced by the distributed routing environment 100.

Based on the processing of the first subset of the destination address, the distribution level router 108B forwards the packet to another distribution level router, in this case illustratively distribution level router 108A, "DIST ROUTER 1." As previously described, the receiving distribution level router 108A processes the destination address of the received packet and also utilizes a subset of the destination IP address to forward the received packet to the next network destination (outside of the distributed routing environment 100). Similar to the distribution level router 108B, the receiving distribution level router can be configured to utilize a selection of the most significant bits of the IP address (e.g., the prefix) to route the packet. In an illustrative embodiment, the prefix used by the distribution level router 108A is greater than the prefix used by the distribution level router 108B. As illustrated in FIG. 2A, an external transit component 110 may be utilized to facilitate the transfer. Alternatively, the distribution level router 108A may transmit the packet directly to the communication network 112. Still further, in the event that distribution level router 108B determines that it is the appropriate router component for the distribution level routing, the same distribution level router 108B may reprocess the destination address information or utilize the previous processing.

Figure 2D:
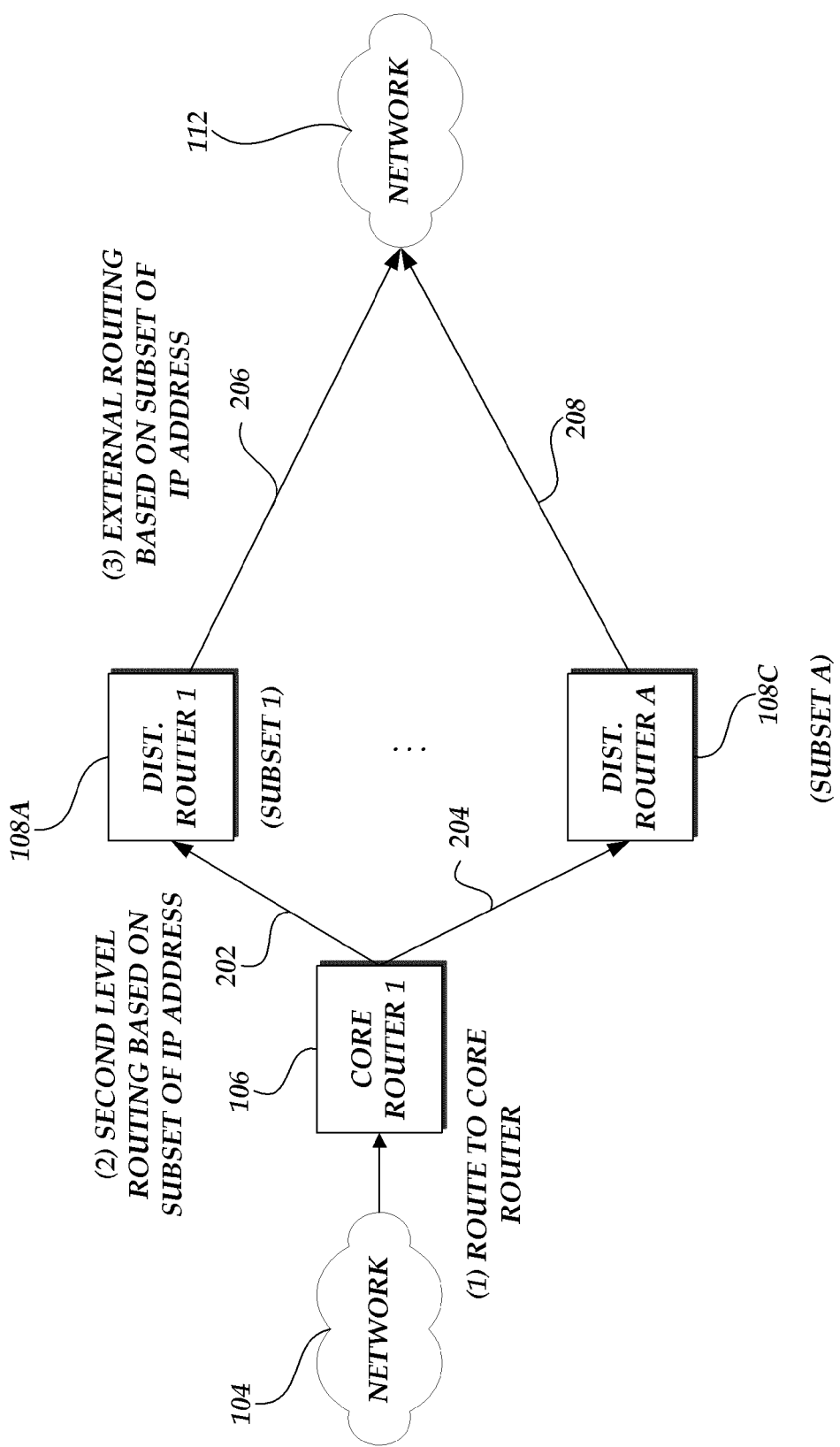

Turning now to FIG. 2D, the allocation of IP addresses or subsets of IP addresses within the distributed routing environment 100 will be described. With reference to FIG. 2D, the core level router 106 distributes some portion of the subset of destination IP addresses to distribution level router 108A (illustrated at 202). The core level router 106 distributes a different portion of the subset of destination IP addresses to distribution level router 108C (illustrated at 204). Distribution level router 108A and 108B in turn further distributes the portions of the IP addresses to the communication network 112, either directly (illustrated at 206 and 208) or via an external transit component 110 (not illustrated).

In an illustrative embodiment, the router management component 102 (FIG. 1) can allocate responsibility of subsets of IP addresses to the distribution level routers in a variety of manners. In one embodiment, the router management component 102 can allocate responsibility for the entire set of IP addresses in accordance with assignment of IP addresses equally, or substantially equally, among available routers. In this embodiment, each distribution level router 108 becomes responsible for an equal subset of IP addresses or substantially equal if the IP addresses cannot be divided equally. In another embodiment, the router management component 102 can specify a specific distribution level router 108 to handle high traffic IP addresses (or prefixes). In this example, the entire subset of IP addresses may be custom selected by the router management component 102. Alternatively, only the subset of IP addresses meeting a traffic threshold may be custom selected with the remaining portions of IP address automatically distributed.

In still a further embodiment, multiple distribution level routers 108 may be selected for a subset of IP addresses. In this embodiment, each core level router 106 can select from multiple distribution level routers 108 based on an equal cost multi-path routing (ECMP) technique in which a specific distribution level router 108 is selected based on a standard load sharing technique. Other factors that can be utilized to select from multiple assigned distribution level router 108 include carrier preference, Internet weather, resource utilization/health reports, an allocated or determined routing cost, service level agreements (SLAs), or other criteria.

In one embodiment, each distribution router 108 can maintain the portion of the FIB that is associated with the subset of IP addresses assigned the respective distribution level router 108. In another embodiment, each distribution level router 108 can maintain the entire FIB associated with the distributed routing environment 100 in a memory component, such as computer readable medium 158 (FIG. 1B). Once a subset of IP addresses are assigned to each respective distribution level router 108 (or otherwise updated), the applicable portions of the FIB are loaded in a different memory components, such as memory component 154 (FIG. 1B) utilized by the router (e.g., a routing chip level content addressable memory or a processor level cache memory). The maintenance of the applicable portions of the FIB in a memory component facilitates better router performance by faster memory access times for the applicable portion of the FIB. However, in this embodiment, the allocation of FIBs to each distribution level router 108 can be modified by loading different portions of the stored FIB from a first memory component storing the entire FIB (e.g., the computer readable medium 158) to the memory component maintaining the portion of the FIB allocated to the distribution level router 108 (e.g., memory component 154). Accordingly, this embodiment facilitates the dynamic allocation of distribution level routers 108, the creation of redundant distribution level routers, and additional failover for distribution level routers. Additionally, one or more core level routers 106 can utilize a similar technique in performing the functions associated with the core level of the distributed routing environment 100.

In still a further embodiment, as a variation to the above embodiment, each distribution level router can be allocated a larger portion of the FIB associated with the distributed routing environment 100 than is capable of being maintained in a first memory component of the router, such as memory component 154 (e.g., a processor level cache memory). If a core level router 106 routes to a distribution level router 108 and the corresponding prefixes of the destination IP address do not correspond to the FIB maintained in the first memory component of the distribution level router, the distribution level router can recall the necessary information from the larger subset of the FIB maintained in a different memory component (e.g., computer readable medium 158 (FIG. 1B)). The FIB maintained in the first memory component (e.g., memory component 152) may be updated to store the prefix in the primary memory component. Alternatively, the FIB in the first memory component may not be automatically updated based on a single request, but based on increases in traffic for a given prefix.

In yet another embodiment, lower traffic prefixes may be assigned to multiple distribution level routers 108. In one example, each assigned distribution level router 108 does not maintain the lower traffic routing portion of the assigned FIB in the primary memory component. Rather, routing requests for the lower traffic prefixes can be directed to a specific distribution level router based on selection techniques, such as ECMP, and can be processed by a selected distribution level router 108 based on the larger FIB maintained in a different memory component within the selected distribution level router.

Figure 3:
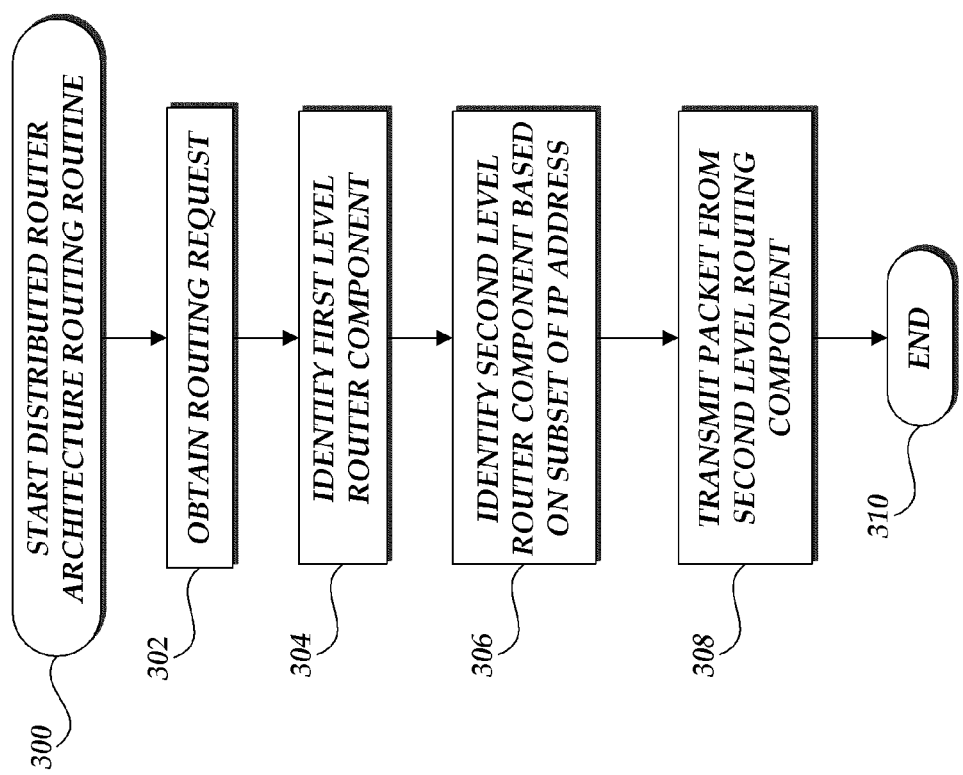
FIG. 3 is a flow diagram illustrative of a distributed router architecture routing routine implemented within a distributed routing environment.

With reference now to FIG. 3, a routine 300 for routing packets and implemented in a distributed routing environment 100 will be described. At block 302, the distributed routing environment 100 obtains a routing request. As previously described, the routing request is received from a first network 102 (FIG. 1) and includes information identifying a destination IP address. At block 304, a core level router 106 corresponding to a first level of the distributed routing environment 100 is selected and receives the routing request. In an illustrative embodiment, each core level router 106 can perform the same function and can selected in accordance with standard selection techniques, including, but not limited to, random selection, round robin selection, load balancing selection and the like.

At block 306, the selected core level router 106 identifies a distribution level router 108 corresponding to a second level of the distributed routing environment 100. The core level router 108 selects the distribution level router 108 based on processing the destination IP address and utilizing a subset of the destination IP addresses (e.g., the prefix) to determine the appropriate distribution level router 108. Illustratively, in accordance with an embodiment corresponding to the IPv4 communication protocol, the core level router 106 processing can be based on consideration of a prefix of the eight most significant bits. One skilled in the relevant art will appreciate, however, the blocks 306 and 308 may be implemented in a manner such the core level router 106 and distribution level router 108 may utilize additional or alternative attributes (including different portions of a destination IP address) of received packets in identifying the next router component to forward the received packet. Still further, as previously described, blocks 304 and 306 may be implemented in accordance with distribution level router 108.

At block 308, the selected distribution level router 108 identifies a transit route for the packet processing the destination IP address and utilizing a subset of the destination IP address. Illustratively, in accordance with an embodiment corresponding to the IPv4 communication protocol, the distribution level router 108 processing can be based on a larger subset of IP address (e.g., a longer prefix such as 16 or 24 bits as needed to select an appropriate transit route). At block 310, the routine 300 terminates.

Figure 4:
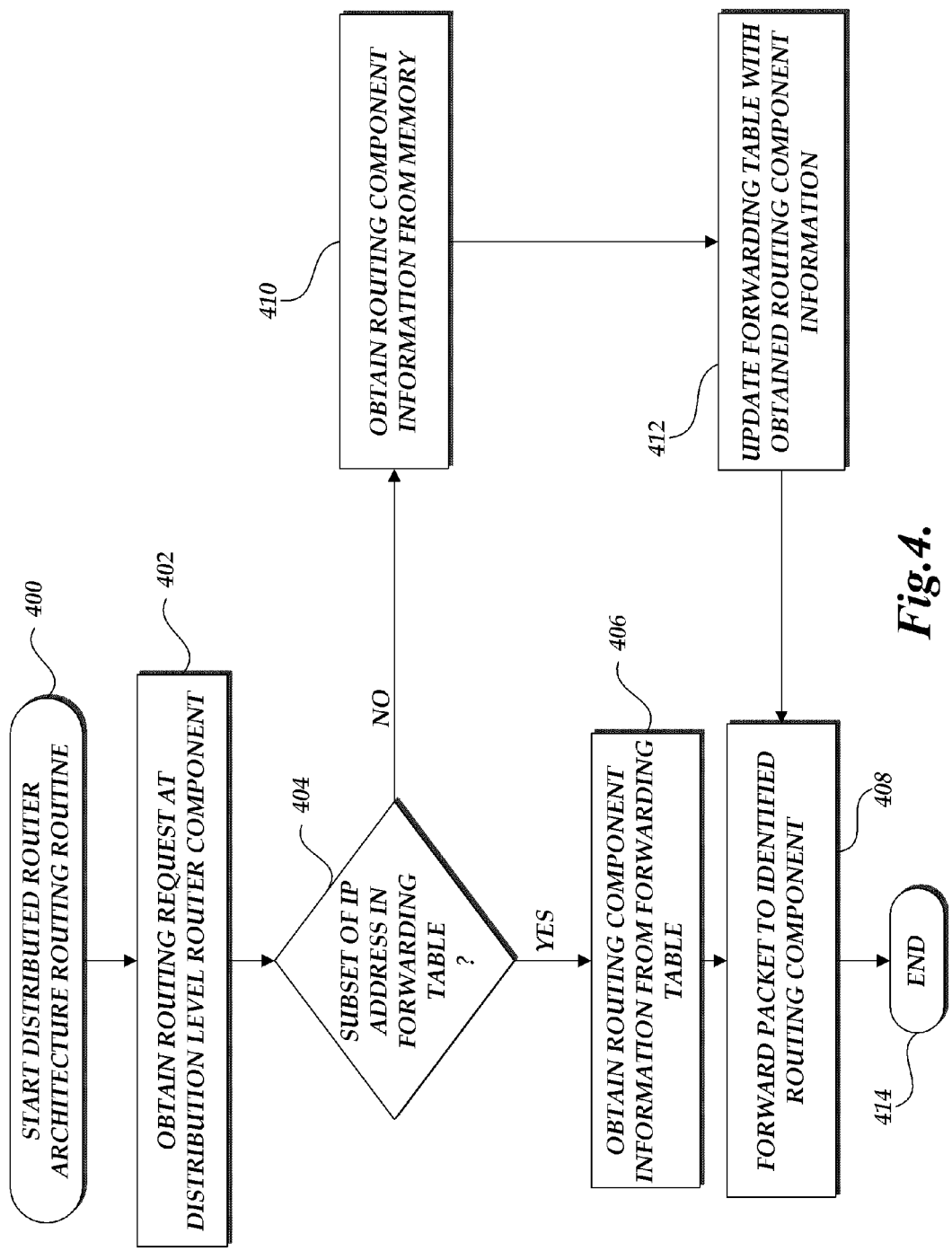
FIG. 4 is a flow diagram illustrative of a distributed router architecture routing routine implemented within a distributed routing environment

With reference now to FIG. 4, another routine 400 for routing packets and implemented in a distributed routing environment 100 will be described. In an illustrative embodiment, routine 400 may be implemented in embodiments in which less than all the FIB associated with a particular distribution router 108 is maintained in a primary memory component. At block 402, a routing request is received at a distribution level router 108. The selection and routing to a distribution level router 108 was previously described above. Although routine 400 will be described with regard to implementation by a distribution level router 108, one skilled in the relevant art will appreciate that at least portions of routine 400 may be implemented by other components of the distributed routing environment 100, such as core level routers 106. At decision block 404, a test is conducted to determine whether the subset of the destination IP address associated with the routing request is in the portion of the FIB table maintained in the primary memory of the selected distribution level router 108. If so, at block 406, the distribution level router 108 obtains the transit layer routing information from the FIB maintained in the first memory component (e.g., memory component 152 (FIG. 1B)). At block 408, the distribution level router 108 forwards the packet along a selected transit route directly or via the external transit component 110.

Alternatively, if at decision block 404 the subset of the destination IP address associated with the routing request is not maintained in the portion of the FIB table maintained in the primary memory of the selected distribution level router 108, at block 410, distribution level router 108 attempts to obtain additional transit routing information from a separate memory component associated with the distribution level router. At block 410, the distribution level router 108 can update the forwarding table information maintained in the primary memory component with the information obtained from the other memory component. Alternatively, block 410 can be omitted or is otherwise optional. At block 412, the routine terminates.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for routing packets comprising:
a router management device, executed on a computing device, for associating destination address information to a router hierarchy comprising a plurality of levels, wherein the router management device is configured to, for each level of the router hierarchy, dynamically assign one or more router devices to a portion of incoming packets based at least in part on traffic volume associated with one or more destination addresses of the incoming packets;
one or more router devices corresponding to a first level of the router hierarchy; and
one or more router devices corresponding to a second level of a router hierarchy, the second level of the router hierarchy for processing an incoming packet for routing received from at least one of the one or more router devices corresponding to the first level of a router hierarchy, wherein each router device corresponding to the second level is dynamically allocated a portion of destination addresses of incoming packets by the router management device, and wherein the portion of destination address is associated with a first subset of destination addresses of incoming packets;
wherein the one or more router devices corresponding to the first level of a router hierarchy receive, for routing, an incoming packet comprising a destination address, and identify at least one router device corresponding to the second level of a router hierarchy based on a first subset of a destination address of the incoming packet, and wherein the at least one router device corresponding to the second level of a router hierarchy identifies an outgoing transit path based on a second" subset of the destination address of the incoming packet, and wherein the second subset of the destination address is greater than the first subset of the destination address.

2. The system as recited in claim 1, wherein the one or more router devices corresponding to a first level of a router hierarchy are selected in accordance with one of random selection, round robin selection, hashing and load balancing.

3. The system as recited in claim 1, wherein the destination address corresponds to an IP address.

4. The system as recited in claim 3, wherein the first subset of the IP address corresponds to the eight most significant bits of the IP address.

5. The system as recited in claim 3, wherein the first subset of the IP address corresponds to at least one of the sixteen or twenty four most significant bits of the IP address.

6. The system as recited in claim 1, wherein at least two of the one or more router devices corresponding to the first level of the router hierarchy are implemented in a common physical router device.

7. The system as recited in claim 1, wherein at least two of the one or more router devices corresponding to the second level of the router hierarchy are implemented in a common physical router device.

8. The system as recited in claim 1, wherein the destination address corresponds to an IP flow descriptor.

9. The system as recited in claim 1, wherein at least two of a router device of the first level of the router hierarchy and a router device of the second level of the router hierarchy are implemented in at least one physical router device.

10. The system as recited in claim 1, wherein at least one router device corresponds to the first and second levels of the router hierarchy.

11. A system for routing packets comprising:
a first set of router devices;
a second set of router devices for routing packet received from the first set of router devices, wherein each of the second set of router devices is dynamically correlated to a portion of destination addresses of incoming packets by a router management device based on a first subset of destination addresses of incoming packets, and wherein each portion of destination addresses is determined based on traffic volumes associated with each portion of the destination addresses; and
an external transit device for routing packets received from the second set of router devices via a plurality of routing paths, wherein each of the plurality of routing paths is dynamically correlated to a portion of destination addresses of incoming packets by the router management device based on a second subset of destination address of incoming packets, and wherein each portion of the destination addresses is determined based on traffic volumes associated with each portion of the destination addresses;
wherein the first set of router devices identify a router device from the second set of router devices correlated to the incoming packet based at least in part on a first subset of a destination address of the incoming packet; and
wherein the second set of router devices identify a routing path correlated to the incoming packet based at least in part on a second subset of a destination address of the incoming packet.

12. The system as recited in claim 11, wherein each router device of the second set of router devices is correlated to a portion of destination addresses of incoming packets based at least in part on a combination of an association of traffic volumes for destination addresses and an equal allocation of remaining destination addresses.

13. The system as recited in claim 11, wherein each router device of the second set of router devices is associated with a threshold number of destination addresses maintainable in a first memory of the router device, and wherein at least one router device of the second set of router devices is correlated with a portion of destination addresses containing more than the threshold number of destination addresses maintainable in the first memory of the at least one router device.

14. The system as recited in claim 11, wherein each router device of the second set of router devices is correlated to a portion of destination addresses of incoming packets based at least in part on an association of low traffic volumes for destination addresses.

15. The system as recited in claim 11, wherein a plurality of router devices of the second set of router devices are correlated to the same set portion of destination addresses.

16. The system as recited in claim 11, wherein first set of router devices are selected in accordance with one of random selection, round robin selection, hash selection and load balancing.

17. The system as recited in claim 11, wherein the destination address corresponds to an IP address.

18. The system as recited in claim 17, wherein the first subset of the IP address corresponds to the eight most significant bits of the IP address.

19. The system as recited in claim 18, wherein the first subset of the IP address corresponds to at least one of the sixteen or twenty four most significant bits of the IP address.

20. The system as recited in claim 11, wherein two or more of the first set of router devices correspond to a single physical router device.

21. The system as recited in claim 11, wherein two or more of the second set of router devices correspond to a single physical router device.

22. The system as recited in claim 11, wherein at least one of the set of first router devices and at least one of the second set of router devices correspond to a single physical router device.

23. The system as recited in claim 11, wherein at least one router device corresponds to at least one of the first and second set of router devices.

24. A method for routing packets comprising:
   obtaining a routing request corresponding to a data packet received from a first communication network;
   identifying a first router component of a first level of a router hierarchy, the first level of the router hierarchy comprising one or more router components;
   forwarding the received data packet to the identified first router;
   identifying a second router component of a second level of the router hierarchy, wherein the second level of the router hierarchy comprises one or more router components, wherein each of the one or more router components of the second level is dynamically associated with a portion of destination addresses of incoming data packets, and wherein each portion of destination addresses is determined based at least in part on traffic volumes associated with the portion of destination addresses and on a first subset of destination addresses;
   forwarding the received data packet to the identified second router; and
   identifying a transit path of a plurality of transit paths corresponding to a communication network, wherein each of the plurality of transit paths is dynamically associated with a portion of destination addresses of incoming data packets, and wherein each portion of destination addresses is determined based at least in part on traffic volumes associated with the portion of destination addresses and on a second subset of destination addresses;
   wherein identifying the second router of the a second level of the router hierarchy is based at least in part on a first subset of a destination address of the received data packet; and
   wherein identifying the transit path of the plurality of transit paths is based at least in part on of a second subset of a destination address of the incoming packet.

25. The method as recited in claim 24, wherein each router component of the second level of the router hierarchy is associated with a portion of destination addresses of incoming data packets based at least in part on a combination of an association of traffic volumes for destination addresses and an equal allocation of remaining destination addresses.

26. The method as recited in claim 24, wherein each router component of the second level of the router hierarchy is associated with a threshold number of destination addresses maintainable in a first memory of the router component, and wherein at least one router component from the second level of the router hierarchy is associated with a portion of destination addresses containing more than the threshold number of destination addresses maintainable in the first memory of the at least one router component.

27. The method as recited in claim 24, wherein each router component of the second level of the router hierarchy associated with a portion of destination addresses of incoming data packets is based at least in part on an association of low traffic volumes for destination addresses.

28. The method as recited in claim 24, a plurality of router component of the second level of the router hierarchy are associated with the same portion of destination addresses.

29. The method as recited in claim 24, wherein the one or more router components of the first level of the router hierarchy are selected in accordance with one of random selection, round robin selection, hash selection and load balancing.

30. The method as recited in claim 24, wherein the destination address corresponds to an IP address.

31. The method as recited in claim 24, wherein the transit path corresponds to an external transit component.

32. The method as recited in claim 24, wherein the transit path corresponds to a communication network.

* * * * *